United States Patent
Lee

(10) Patent No.: US 8,264,782 B2
(45) Date of Patent: Sep. 11, 2012

(54) IMAGING LENS

(75) Inventor: Jungyul Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 91 days.

(21) Appl. No.: 12/969,123

(22) Filed: Dec. 15, 2010

(65) Prior Publication Data

US 2011/0141581 A1    Jun. 16, 2011

(30) Foreign Application Priority Data

Dec. 15, 2009    (KR) ........................ 10-2009-0124946

(51) Int. Cl.
*G02B 17/00* (2006.01)

(52) U.S. Cl. .................... 359/729; 359/728; 359/733

(58) Field of Classification Search .................. 359/726, 359/727, 728, 729, 733

See application file for complete search history.

(56) References Cited

U.S. PATENT DOCUMENTS

| 5,473,474 | A  | * | 12/1995 | Powell | 359/725 |
| 7,224,520 | B2 | * | 5/2007 | Mitchell | 359/357 |
| 7,554,676 | B2 | * | 6/2009 | Seko | 356/614 |
| 2012/0105980 | A1 | * | 5/2012 | Peng et al. | 359/729 |

* cited by examiner

*Primary Examiner* — David N Spector
(74) *Attorney, Agent, or Firm* — Saliwanchik, Lloyd & Eisenchenk

(57) ABSTRACT

Provided is an imaging lens, the imaging lens including in an orderly way from an object side, a first lens including an incidence surface having a positive (+) refractive power and incident with light, a reflecting surface reflecting the incident light and an exit surface outputting the reflected light; a second lens having a negative (−) refractive power; a third lens having a positive (+) refractive power; a fourth lens having a positive (+) refractive power; a fifth lens having a negative (−) refractive power; a sixth lens having a positive (+) refractive power; and a seventh lens having a positive (+) refractive power, wherein the second lens through the seventh lens are disposed in an orderly way from an exit surface of the first lens.

20 Claims, 3 Drawing Sheets

IMAGING LENS

CROSS-REFERENCE TO RELATED APPLICATION

This application claims the benefit under 35 U.S.C. §119 of Korean Application No. 10-2009-0124946, filed on Dec. 15, 2009, which is hereby incorporated by reference in its entirety.

BACKGROUND OF THE DISCLOSURE

1. Field of the Invention

The present invention relates to an image lens, and in particular, to a wide angle lens widen with a viewing angle.

2. Discussion of the Related Art

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such an image pickup system obtains an image is an imaging lens producing an image.

A camera module generally realizes an image by refracting light using optical material. A wide angle lens favorable when photographing many people in a small space by ampling an imaging angle embodies a wide angle optical system by a negative and positive (−)(+) structure group (retro-focus) formulating several pieces of negative (−) power lenses at the front side to enlarge an imaging angle range. In this case, a cost allocation is much required, and a thickness due to construction of several pieces when compacted cameras should be realized becomes burdensome.

BRIEF SUMMARY

The present invention provides a wide angle lens devoid of a thickness burden due to a lens constituting in several pieces, especially, it provides a wide angle lens excellent in aberration characteristic.

An image lens according to one embodiment of the present invention comprises in an orderly way from an object side, a first lens including an incidence surface having a positive (+) refractive power and incident with light, a reflecting surface reflecting the incident light and an exit surface outputting the reflected light; a second lens having a negative (−) refractive power; a third lens having a positive (+) refractive power; a fourth lens having a positive (+) refractive power; a fifth lens having a negative (−) refractive power; a sixth lens having a positive (+) refractive power; and a seventh lens having a positive (+) refractive power, wherein the second lens through the seventh lens are disposed in an orderly way from an exit surface of the first lens.

A wide angle lens module according to the present embodiment provides a wide angle lens without thickness concern in the result of applying a reflecting surface of an aspheric surface to a first lens to enlarge an imaging angle. A wide angle lens superior in optical characteristic may be realized.

DETAILED DESCRIPTION

Figure 1:
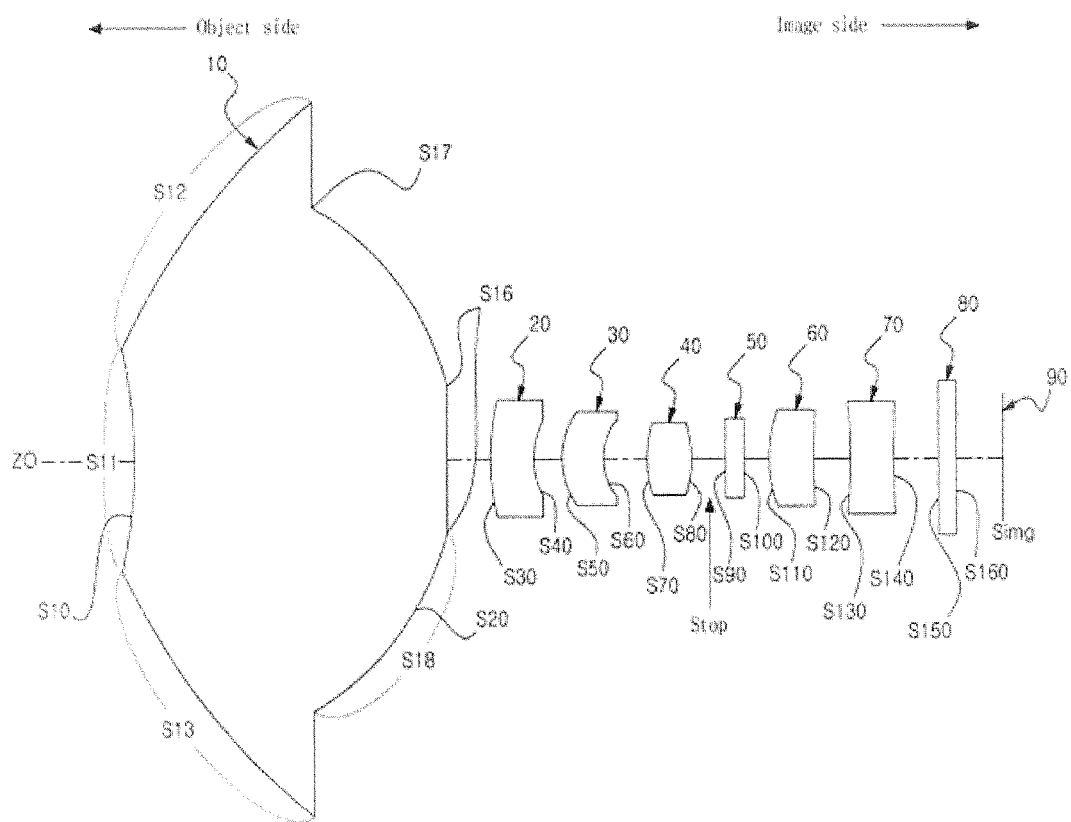
FIG. 1 is a construction diagram of an imaging lens according to the present embodiment.

Since the present invention can be applied with various changes thereto and have several types of embodiments, specific embodiments intend to be exemplified in the drawings and minutely described in the detailed description. However, it does not limit the present invention to a specific example but should be appreciated to include all the changes, equivalents and replacements which fall in the spirit and technical scope of the present invention.

Stated that any component is "connected" or "conjunctive" to another component, it will be appreciated to be directly connected or conjunctive to the very another component or otherwise that there exists any component in the midst of them.

In the following, the present invention will be described in detail referring to the attached drawings, but without regard to a drawing sign, an identical or corresponding component is assigned the same reference numeral and a redundant description regarding this will be omitted.

As a construction diagram of an imaging lens according to the present embodiment, FIG. 1 is a lateral surface construction diagram exemplifying a layout state of a lens around an optical axis ZO. In the construction of FIG. 1, a thickness, size, and shape of a lens are rather overdrawn for description, and a spheric or aspheric shape has been only presented as one embodiment, but obviously not limited to this shape.

Referring to FIG. 1, an imaging lens of the present invention has a layout construction with a first lens 10, a second lens 20, a third lens 30, a fourth lens 40, a fifth lens 50, a sixth lens 60, a seventh lens 70, a filter 80, and a light receiving element 90 in order from an object side. Light corresponding to image information of a subject passes through the first lens 10, the second lens 20, the third lens 30, the fourth lens 40, the fifth lens 50, the sixth lens 60, the seventh lens 70 and the filter 80 to be incident on the light receiving element 90.

Hereinafter, in description of a construction of each lens, "object side surface" means a surface of a lens facing an object side to an optical axis, and "image side surface" means a surface of a lens facing an image surface to an optical axis.

A first lens 10 includes an incidence surface S12, S13 having a positive (+) refractive power and on which light is incident, a reflecting surface S11, S17, S18 reflecting incident light and an exit surface S16 where there outputs reflected light, wherein an object side surface is concavely formed. A surrounding part of an object side surface S10 of a first lens 10 may include an incidence surface S12, S13, a central part may include a reflecting surface S11, and a reflecting surface S11 is concavely formed. A surrounding part of an imaging side surface S20 of a first lens 10 may include a reflecting surface S17, S18 and a central part may include an exit surface S16.

A second lens 20 has negative (−) refractive power, and constructed of a meniscus form in which an object side surface S30 is convexly formed.

A third lens 30 has positive (+) refractive power, and constructed of a meniscus form convexly formed at an object side surface S50. A fourth lens 40 has positive (+) refractive power, both surfaces of an object side surface S70 and S80 are forms formulated convexly. An object side surface S80 of a fourth lens 40 may act as an aperture, and in this case, an imaging lens of the present embodiment may not need an additional aperture. Also, an aperture is placed between a fourth lens 40 and a fifth lens 50.

A fifth lens 50 has negative (−) refractive power, and constructed of a form formulated concavely at both an object side surface S90 and an imaging side surface S100.

A sixth lens 60 has positive (+) refractive power, and is a meniscus form formulated convexly at an object side surface S110. A seventh lens 70 has positive (+) refractive power, and is a meniscus form in which an object side surface S130 is concavely formed.

As shown in the figure, an incidence surface S12, S13 and an reflecting surface S17, S18 of the first lens 10 and an object side surface S130 and an imaging side surface S140 of a seventh lens 70 are constructed of an spheric face. The first lens 10 is a lens containing a reflecting surface, the second lens 20 through the sixth lens 60 are formed of glass, and the seventh lens 70 may be formed of a plastic lens.

The filter 80 is at least any one of optical filters such as an infrared filter and a cover glass. A filter 40, in a case an infrared filter is applied, blocks such that radiating heat emitting from external light does not transfer to the light receiving element 90. Also, an infrared filter penetrates visible light and reflects infrared for outflow to an external part.

The light receiving element 90 is an imaging sensor such as CCD (Charge Coupled Device) or CMOS (Complementary Metal Oxide Semiconductor).

The first lens 10 uses an aspheric lens like a later-described embodiment, thereby improving resolution of a lens and taking an advantage of superior aberration characteristic. A later-described conditions and embodiment is a preferred embodiment raising an action and effect, and it would be understood by a person in the art that the present invention should be constructed of the following conditions. For example, a lens construction of the invention will have a raised action and effect only by satisfying part of conditions among lower-part described condition equations.

$-2 < k1 < -1.0$ [Condition 1]

$-1 < k2 < 0$ [Condition 2]

$3 < d1/d2 < 5$ [Condition 3]

where, k1 is an aspheric constant of the surface S12, S13 of a first lens 10, k2 is an aspheric constant of the surface S17, S18 of a first lens 10, d1 is a diameter of the surface S12, S13 of a first lens 10, and d2 is a diameter of the surface S17, S18 of the first lens 10.

Hereinafter, an action and effect of the present invention will be presented with reference to a specific embodiment. An aspheric shape mentioned in the following embodiment is obtained from a known Equation 1, and Conic constant and 'E and its continuing number' used in aspheric coefficient A, B, C, D, E, F indicate power of 10. For example, E+01 indicates $10^1$, and E-02 indicates $10^{-2}$.

$$z = \frac{cY^2}{1 + \sqrt{1 - (1+K)c^2 Y^2}} + AY^4 + BY^4 + CY^4 + DY^4 + EY^4 + FY^4 + \ldots$$ Equation 1 where, z: distance in optical axis direction from top point of lens
c: basic curvature of lens
Y: distance in perpendicular direction to optical axis
K: Conic constant
A, B, C, D, E, F: aspheric coefficient Embodiment The following Table 1 shows an embodiment complying with the above-described Condition.

TABLE 1

|  | Embodiment |
| --- | --- |
| k1 | −1.2 |
| k2 | −0.17 |
| d1 | 16.57 |
| d2 | 4.8 |

Referring to Table 1, k1 is −1.2, so that it can be known to match with Condition 1, k2 is −0.17, and thus matching to Condition 2 can be known. Also, since d1/d2 is 3.45, and it can be appreciated matching with Condition 3.

An embodiment of Table 2 shows a more specific embodiment over an embodiment of Table 1.

TABLE 2

| Surface number | Curvature Radius (R) | Thickness or Distance (d) | Refractive index (N) |
| --- | --- | --- | --- |
| 1* | 12.0 | 20 | 1.52 |
| 2* | −13.0 | −18.0 | 1.52 |
| 3 | −21.77 | 17.45 | 1.52 |
| 4 |  | 0.5 |  |
| 5 | 11.70 | 2.5 | 1.67 |
| 6 | 3.97 | 0.54 |  |
| 7 | 3.69 | 2.38 | 1.75 |
| 8 | 2.8 | 1.36 |  |
| 9 | 5.71 | 2.5 | 1.62 |
| 10*stop | −5.71 | 1.60 |  |
| 11 | −36.08 | 1.0 | 1.76 |
| 12 | 36.08 | 1.34 |  |
| 13 | 6.50 | 2.5 | 1.61 |
| 14 | 24.83 | 2.61 |  |
| 15* | −1.32 | 2.45 | 1.53 |
| 16 | −1.41 | 5.06 |  |
| image |  | 0 |  |

In the above Table 2 and the following Table 3, notation * stated next to surface numbers indicates an aspheric surface, and continuingly, surface number 1 indicates surfaces S12, S13 of a first lens 10, surface number 2 indicates surfaces S17, S18 of a first lens 10, surface number 3 indicates surface S11 of a first lens 10, and surface number 4 indicates surface S16 of the first lens 10. Commencing from surface number 5 to surface number 16 denote an object side surface and an imaging surface of a second lens 20 through a seventh lens 70 in regular sequence.

The following Table 3 indicates a value of an aspheric coefficient of each lens in an embodiment of the Table 2.

TABLE 3

| Surface Number | K | A | B | C | D |
| --- | --- | --- | --- | --- | --- |
| 1* | −1.2 |  |  |  |  |
| 2* | −0.17 |  |  |  |  |
| 15* | −164335.02 | −0.3065E−02 | 0.30597E−05 | 0.17963E−04 | −0.46813E−0 |
| 16* | −0.7098E15 | −0.2009983 | 0.8336E−04 | −0.6496E−06 | −0.8921E−06 |

Figure 2:
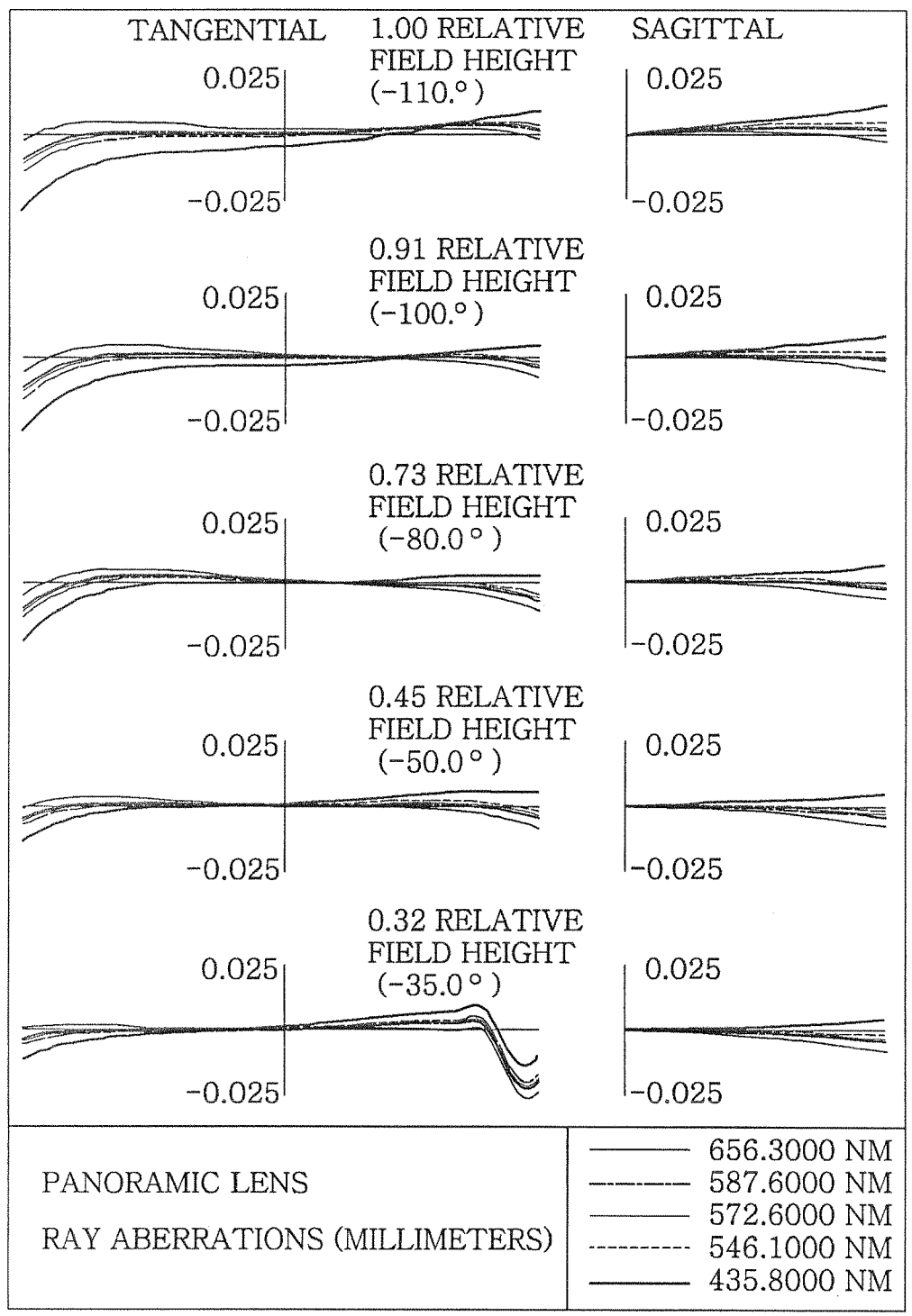
FIG. 2 is a graph showing Coma aberration according to the present embodiment.

As a graph measuring coma aberration, FIG. 2 is a graph measuring tangential aberration and sagittal aberration of each wavelength based on a field height. In FIG. 2, as a graph showing a test result approaches to an X axis at a positive axis and a negative axis, respectively, it is explained that a coma aberration correction function is good. In measurement examples of FIG. 2, a value of images in nearly all fields appear proximate to an X axis, it is explained that all of them show a superior commatic aberration correction function.

Figure 3:
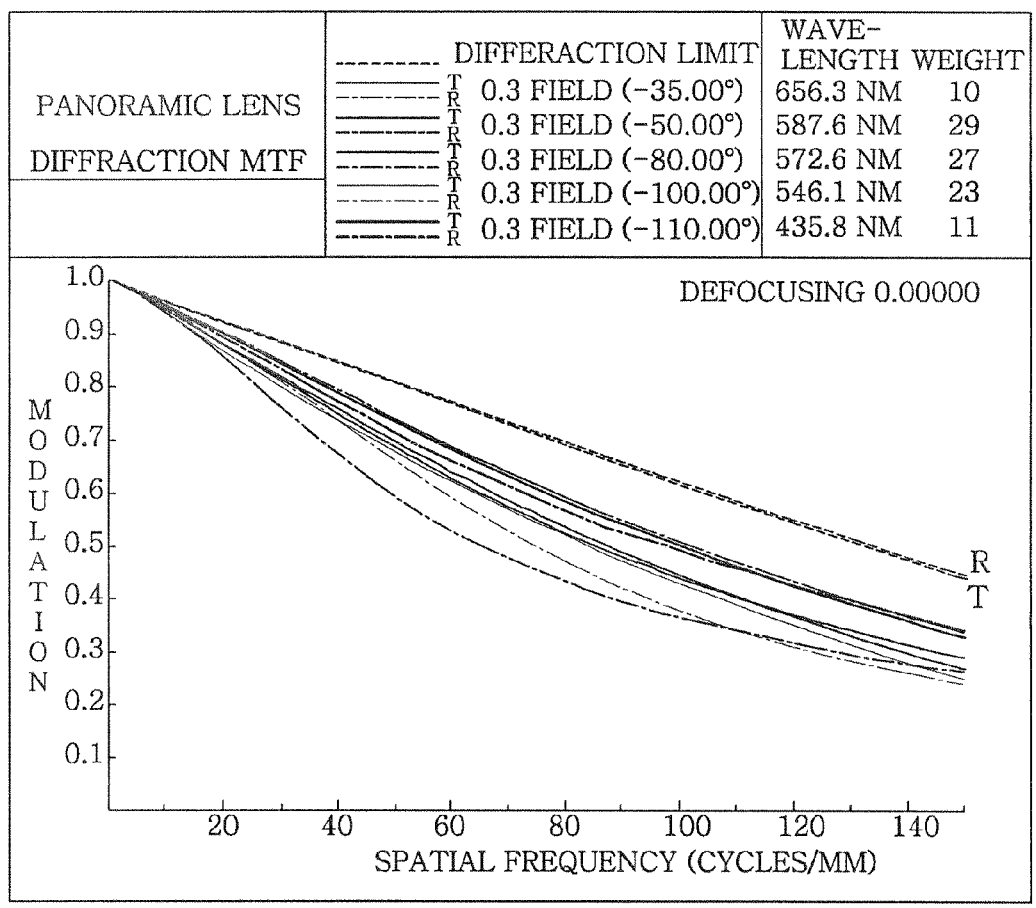
FIG. 3 is a graph showing MTF (modulation transfer function) characteristic according to one embodiment of the present invention.

FIG. 3 is a graph showing MTF (modulation transfer function) characteristic according to one embodiment of the invention. FIG. 3 has measured an MTF characteristic depending on a variation of spatial frequencies at cycle per millimeter (cycle/mm). Here, an MTP characteristic refers to a rate obtained by calculating a difference between light starting from an original subject surface and a formed image that passes through a lens, wherein a case of MTF figure '1' is the most idealistic, and as MTF values decrease, resolution falls down.

Referring to FIG. 3, since FIG. 3 indicating that an MTF value is high, it can be known that a wide angle lens module according to an embodiment is superior in optical performance.

While the present invention has been described with reference to embodiments in the above part, it would be understood by those skilled in the art that various changes and modifications can be made without departing from the spirit or scope of the present invention. Therefore, not confined to the above-described embodiment, the invention would be asserted to include all embodiments within the scope of the accompanying claims.

What is claimed is:

1. An imaging lens, comprising in an orderly way from an object side:
    a first lens including an incidence surface having a positive (+) refractive power and incident with light, a reflecting surface reflecting the incident light and an exit surface outputting the reflected light;
    a second lens having a negative (−) refractive power;
    a third lens having a positive (+) refractive power; a fourth lens having a positive (+) refractive power;
    a fifth lens having a negative (−) refractive power;
    a sixth lens having a positive (+) refractive power; and
    a seventh lens having a positive (+) refractive power,
    wherein the second lens through the seventh lens are disposed in an orderly way from an exit surface of the first lens.

2. The imaging lens of claim 1, wherein an image side surface of the first lens includes the reflecting surface at a surrounding part, and includes the exit surface at a central part.

3. The imaging lens of claim 1, wherein the second lens, the third lens, the fourth lens and the sixth lens are convexly formed at an object side surface.

4. The imaging lens of claim 1, wherein the fourth lens is convexly formed at both of an object side surface and an imaging side surface, and the fifth lens is concavely formed at both of an object side surface and an imaging side surface.

5. The imaging lens of claim 1, wherein the second lens, the third lens, the sixth lens and the seventh lens are lenses of a meniscus form.

6. The imaging lens of claim 1, wherein the second lens, the third lens, the fourth lens, the fifth lens and the sixth lens are formed of glass, and the seventh lens is formed of plastic.

7. The imaging lens of claim 1, wherein the second lens, the third lens and the seventh lens are a meniscus form convexly formed at the object side.

8. The imaging lens of claim 1, wherein an imaging side surface of the fourth lens acts as an aperture.

9. The imaging lens of claim 1, wherein an aperture is further included between the fourth lens and the fifth lens.

10. The imaging lens of claim 1, wherein the fifth lens is concave at dual surfaces of the object side and an imaging side.

11. The imaging lens of claim 1, wherein the first lens includes an incident surface incident with light, a reflecting surface reflecting the incident light and an exit surface outputting the reflected light.

12. The imaging lens of claim 11, wherein the first lens is concave at the object side.

13. The imaging lens of claim 1, wherein light corresponding to image information of a subject inputs to the first lens, and the light is output from the seventh lens.

14. The imaging lens of claim 13, wherein light leaving from the seventh lens is incident on an imaging sensor.

15. The imaging lens of claim 14, wherein an infrared filter is further included between the seventh lens and the image sensor, transmitting visible rays and reflecting infrared.

16. The imaging lens of claim 1, wherein an object side surface of the first lens includes the incidence surface at a surrounding part, and the reflecting surface at a central part, where the reflecting surface is concavely formed.

17. The imaging lens of claim 16, wherein an incidence surface of object side surface of the first lens and a reflecting surface of the image side surface of the first lens and an image side surface and an object side surface of the seventh lens are constructed of aspheric faces.

18. The imaging lens of claim 16, wherein the imaging lens satisfies a condition of −2<k1<−1.0, when an aspheric constant of the incidence surface of object side surface of the first lens is k1.

19. The imaging lens of claim 16, wherein the imaging lens satisfies a condition of −1<k2<0, when an aspheric constant of the reflecting surface of the image side surface of the first lens object side is k2.

20. The imaging lens of claim 16, wherein the imaging lens satisfies a condition of 3<d1/d2<5, when a diameter of the incidence surface of the object side surface of the first lens is d1, and a diameter of the reflecting surface of the imaging side surface of the first lens is d2.

* * * * *